N. L. LAMB.
NON-SKID ATTACHMENT.
APPLICATION FILED JAN. 19, 1918.
1,286,656.
Patented Dec. 3, 1918.
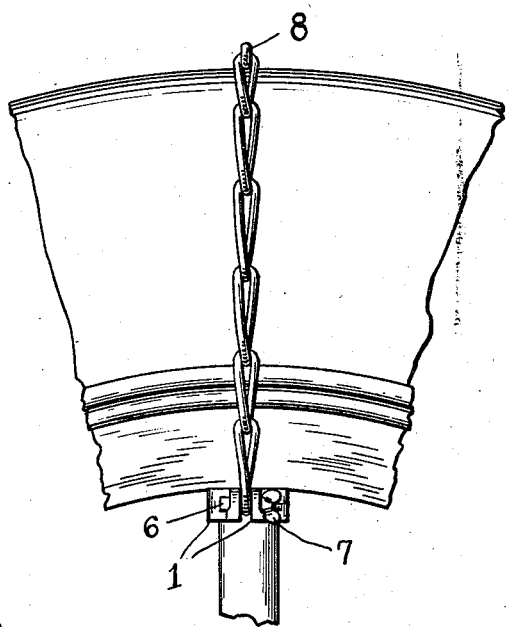
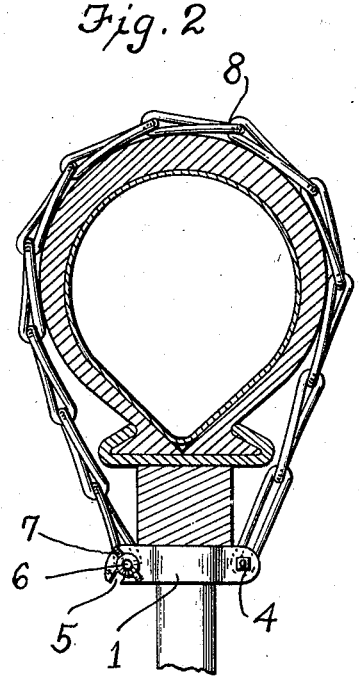
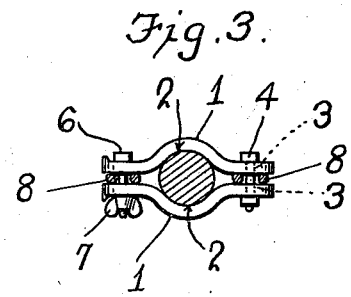
Witnesses
L. B. James
I. Wilcox
Inventor
N. L. Lamb
By Victor J. Evans
Attorney

UNITED STATES PATENT OFFICE.

NORMAN L. LAMB, OF BOONE, IOWA.

NON-SKID ATTACHMENT.

1,286,656.  Specification of Letters Patent.  Patented Dec. 3, 1918.

Application filed January 19, 1918. Serial No. 212,706.

*To all whom it may concern:*

Be it known that I, NORMAN L. LAMB, a citizen of the United States, residing at Boone, in the county of Boone and State of Iowa, have invented new and useful Improvements in Non-Skid Attachments, of which the following is a specification.

This invention relates to a non-skid attachment especially adapted to be applied to the tire of an automobile or other power driven vehicles and it consists in the novel features hereinafter described and claimed.

The device includes clamp members adapted to be applied to the opposite sides of a spoke of the wheel at the felly thereof, the said clamp members being secured together at one end by means of a bolt which passes through circular perforations provided in the members. The members are provided at their opposite ends with slots which are disposed at acute angles with relation to the median longitudinal dimensions of the said members, the said slots being disposed away from the felly of the wheel when the clamping devices are applied. The said slots receive a bolt which is provided with a wing nut. A chain section is adapted to pass around the tire of the wheel and the terminal link at one end of the section receives the bolt which passes through the circular perforations of the clamp members and the terminal link at the other end of the chain section receives the bolt which is located in the slots.

In the accompanying drawing:—

Figure 1 is a fragmentary side elevation of the wheel with the non-skidding attachment applied.

Fig. 2 is a fragmentary transverse sectional view of the same.

Fig. 3 is a detail sectional view of the same.

The non-skidding device comprises clamp members 1 which are provided at points between their ends with transversely disposed recesses 2 adapted to receive the opposite side portions of the spoke of a wheel. The members 1 are provided at one end with circular openings 3 which receive a bolt 4. The members 1 are provided at their opposite ends with slots 5, the longitudinal dimensions of which are disposed at acute angles with relation to the corresponding dimensions of the clamp members 1. When the clamp members 1 are applied to the spoke of a wheel, the outer ends of the slots 5 are disposed away from the felly of the wheel. The slots 5 receive a bolt 6 and a wing nut 7 is screw-threaded upon one end of the bolt and bears against the outer surface of one of the clamp members 1. A chain section 8 passes around the tire of the wheel and the terminal link of the section at one end of the same receives the bolt 4 and the terminal link of the chain section at the opposite end receives the bolt 6. The terminal links of the chain section 8 are located between the end portions of the clamp members 1. Consequently when the said bolts are tightened and the clamp members are drawn toward each other they securely bind and hold the chain section and also the said bolts retain the clamp members in position at the opposite sides of the spoke of the wheel.

When the device is applied the intermediate portion of the chain section will have contact with the surface of the roadway and consequently the wheel is prevented from slipping or skidding as the same passes over a relatively smooth surface.

From the foregoing description taken in conjunction with the accompanying drawing it will be seen that a non-skidding device of simple and durable structure is provided, that the same may be easily and quickly applied to a wheel or removed therefrom, and when in position thereon will effectually prevent the wheel from slipping or skidding as it passes over a comparatively smooth surface.

Having described the invention what is claimed is:—

A clamp comprising members, a bolt passing through one end of the clamp members, said clamp members being provided at their opposite ends with slots which enter from the edges thereof and which are disposed at acute angles with relation to the median longitudinal dimensions of the clamp members, a bolt located in said slots and a nut screw-threaded to said bolt whereby said members may be clamped together.

In testimony whereof I affix my signature.

NORMAN L. LAMB.

Copies of this patent may be obtained for five cents each, by addressing the "Commissioner of Patents, Washington, D. C."